United States Patent [19]

Kling et al.

[11] 4,109,095

[45] Aug. 22, 1978

[54] WEATHERPROOF ELECTRICAL OUTLET BOX COVER

[75] Inventors: David A. Kling, Martinsville; Charles W. Bell, Maplewood, both of N.J.

[73] Assignee: Mulberry Metal Products, Inc., Union, N.J.

[21] Appl. No.: 736,578

[22] Filed: Oct. 28, 1976

[51] Int. Cl.$^2$ .............................................. H02G 3/18
[52] U.S. Cl. ..................................... 174/67; 220/242
[58] Field of Search ......................... 174/67; 220/242; 339/36, 43, 44 R, 44 M, 39

[56] References Cited

U.S. PATENT DOCUMENTS

| | | | |
|---|---|---|---|
| 3,467,763 | 9/1969 | Shaw | 174/67 |
| 3,639,886 | 2/1972 | Drapkin | 339/36 |
| 4,031,312 | 6/1977 | Coleman et al. | 339/44 R X |

FOREIGN PATENT DOCUMENTS 713,389  8/1954  United Kingdom ..................... 174/59

Primary Examiner—J. V. Truhe
Assistant Examiner—D. A. Tone
Attorney, Agent, or Firm—Kenyon and Kenyon, Reilly, Carr & Chapin

[57] ABSTRACT

The weatherproof box cover has a pair of lids which are biased towards each other so as to be self-closing. Each lid has a gear-like portion which meshes on the other so as to synchronize movement of the lids to each other. In addition, each lid has a recess along the outer edge in which a resilient sealing strip seats. When closed over a cord of an electrical appliance, the sealing strips conform to the shape of the cord while the lids are brought into seal-tight relationship. In this way, a water spray and the like is prevented from entering into the cover from any direction.

10 Claims, 5 Drawing Figures

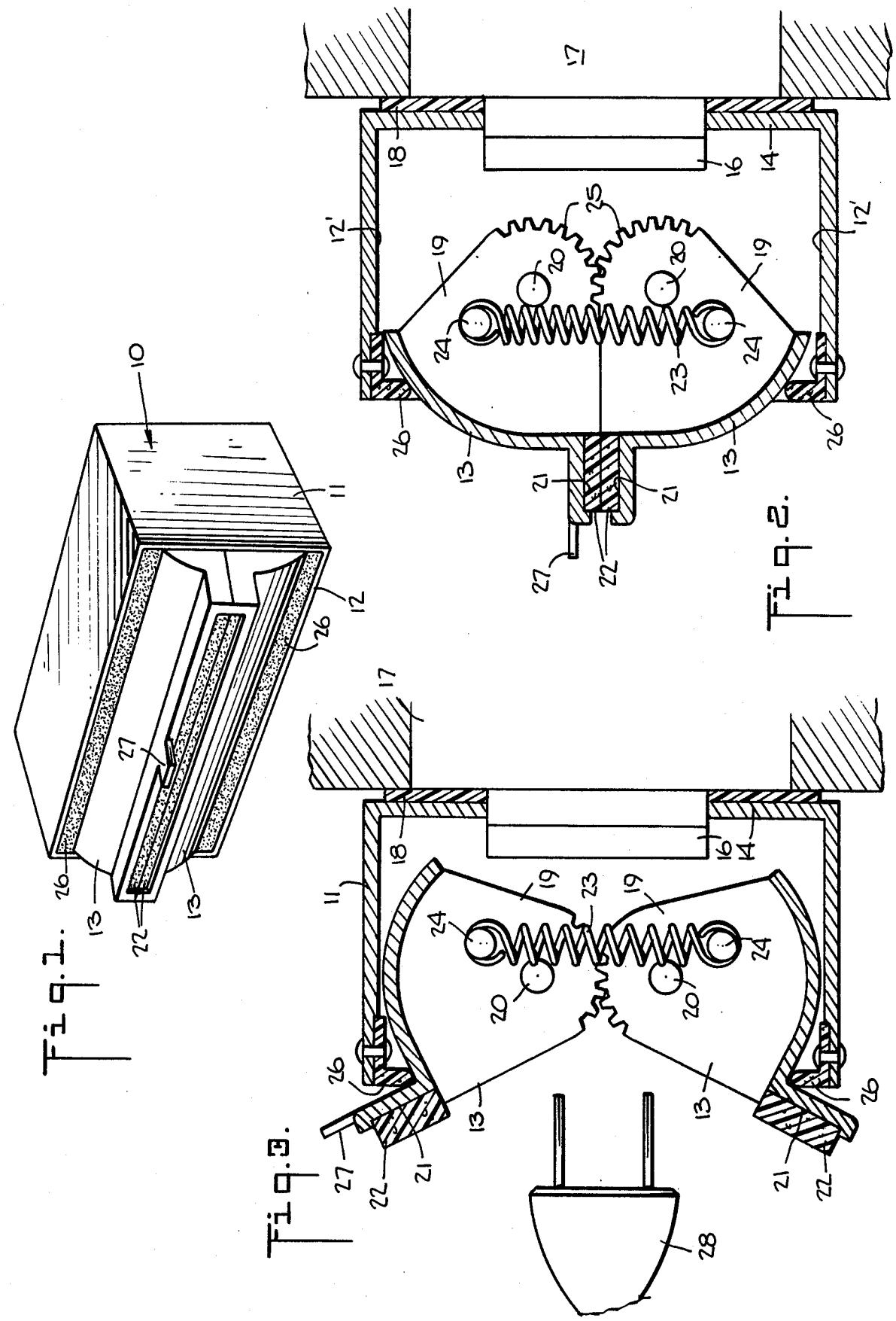

U.S. Patent  Aug. 22, 1978  Sheet 2 of 2  4,109,095
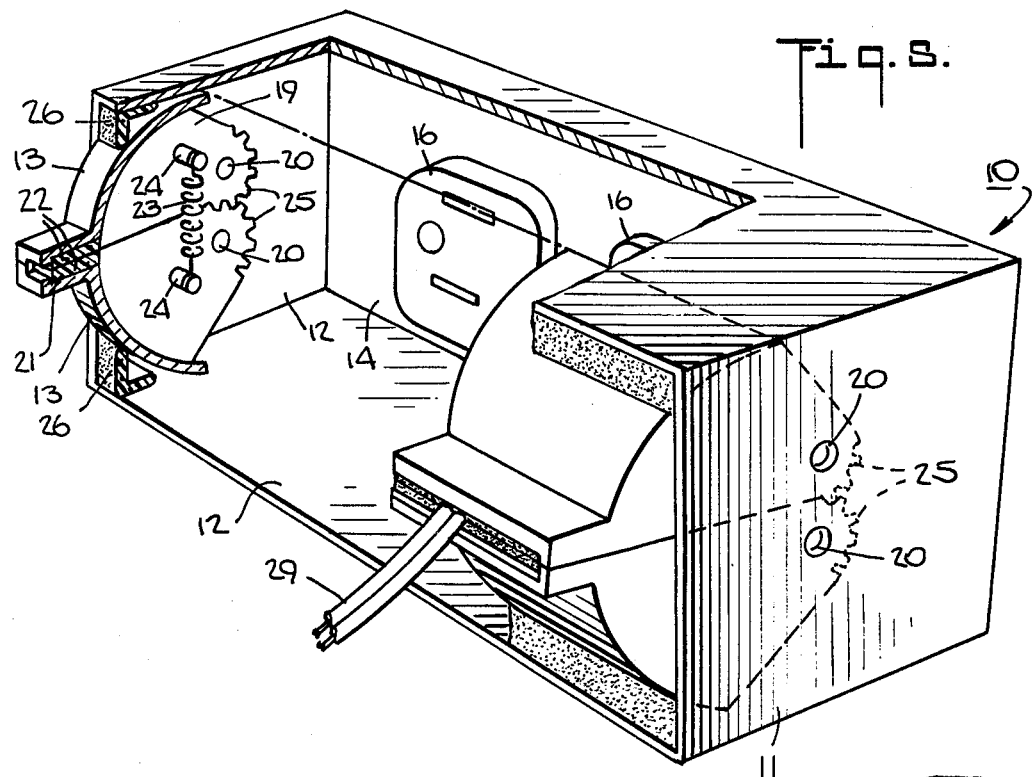
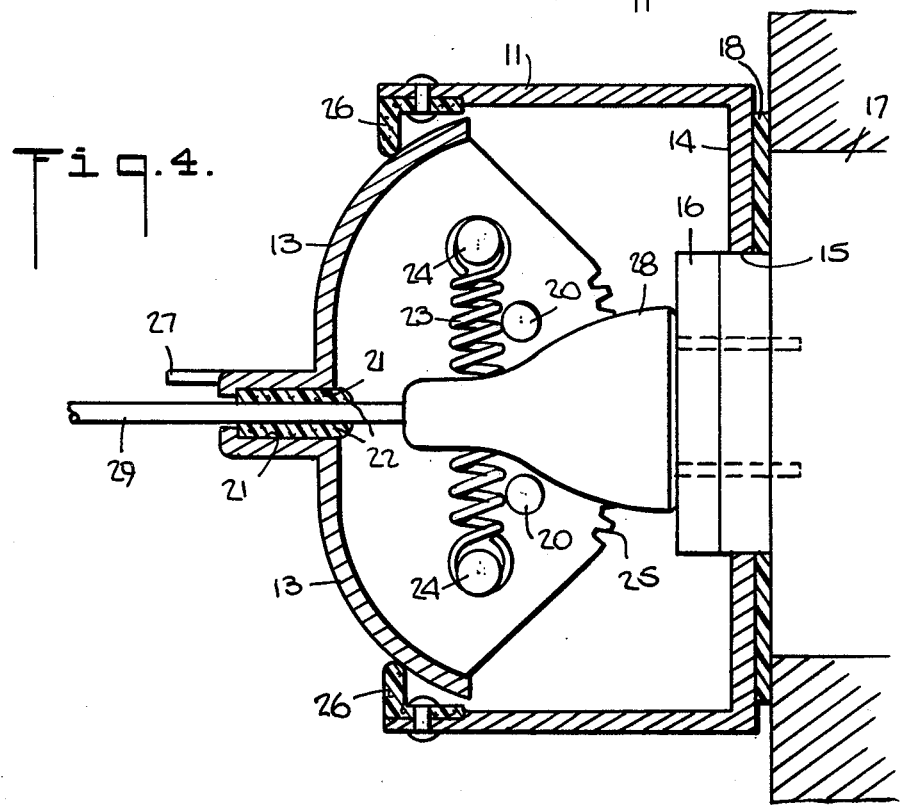

WEATHERPROOF ELECTRICAL OUTLET BOX COVER

This invention relates to a weatherproof electrical outlet box cover.

As is known, various attempts have been made to provide weatherproof electrical junction boxes and covers particularly for use in outdoor environments. In many instances, junction boxes have been provided with a cover which can be opened to permit access to an outlet of the box for plugging in of an electrical appliance. For example, as described in U.S. Pat. No. 3,686,425, it has been known to provide an electrical junction box with a hooded cover which is spring-loaded to pivot downwardly to close over an electrical outlet. However, covers of this type do not provide adequate protection when an electrical appliance is plugged into an outlet. Specifically, in this condition, the cover is prevented from fully closing due to the presence of a cord extending from the plug. As a result, an opening is provided into the junction box area from below through which rainwater may splash or through which a spray of water may pass into the junction box.

It has also been known to construct plug receptacles, for example, as described in U.S. Pat. Nos. 629,445 and 900,773 with hinged doors or lids to close over a plug inserted into an electrical outlet. In some cases, hinged doors are provided with cutouts which are sized to a given plug size so as to cover over the plug. In other cases, an opening is provided by the doors to afford clearance for a wire leading from the plug while at the same time being sized to allow withdrawal of the plug. In the first case, the covers can be used with only one size plug since plugs of larger size would prevent complete closing of the doors while plugs of smaller size provide a clearance through which dust, dirt, water and the like may enter. In the latter case, a clearance is provided in which dust, dirt, water and the like can enter.

Accordingly, it is an object of this invention to provide a cover for an outdoor electrical junction box which fully seals the junction box when in a closed position.

It is another object of the invention to effectively preclude the entry of a spray of water into an electrical junction box into which an appliance is plugged.

It is another object of the invention to provide a cover which is self-closing.

It is another object of the invention to protect an electrical outlet from rainwater entering from any direction with an electrical outlet plugged into the outlet.

Briefly, the invention provides a weatherproof electrical outlet box cover which comprises a housing for covering over an electrical outlet and having an opening on one side, a pair of lids which are mounted on the housing to close over the opening, means for biasing the lid into a closed position on each other and a pair of resilient sealing strips. The strips are disposed at the edges of a respective lid in facing relation to each other for sealingly engaging about a cord of an electrical appliance extending into the housing to the electrical outlet.

When the outlet box cover is in a fully closed position, the sealing strips seat against each other in a deformed state to seal the housing. When an electrical appliance is plugged in, the sealing strips seal conform to the cord while being slightly deformed throughout the remainder of the lids to retain a sealed relationship.

The means for moving the lids together includes a spring which is secured at opposite ends to each lid in order to bias the lids together into the closed position. In addition, each of the lids has a gear-like or ratchet portion which meshes with a similar gear-like portion on the other lid in order to synchronize the movements of the lids to each other. Also, a gripping portion is mounted on a central region of one of the lids to provide a hand-grip for opening of the lids.

The box covers may be made of any suitable materials, such as non-corrosive materials and the movable lids may also be made of a transparent plastic in order to provide ready visual viewing of the interior of the cover.

Because the cover is fully closed about the cord of an electrical appliance, rainwater, dirt, splashing water or sprays and the like are prevented from moving into the junction box from any angle.

The cover may be used for single or duplex receptacles. In either case, a fully sealed receptacle is obtained. For example, if only one attachment plug cap is plugged into one of the electrical outlets of a duplex receptacle, the sealing gaskets retain a sealing relationship throughout.

These and other objects and advantages of the invention will become more apparent from the following detailed description and appended claims taken in conjunction with the accompanying drawings in which:

FIG. 1 illustrates a perspective view of an outlet box cover according to the invention;

FIG. 2 illustrates a cross-sectional view of a waterproof electrical outlet box cover mounted over an electrical outlet of a junction box;

FIG. 3 illustrates a view similar to FIG. 2 with the cover in an open position to permit entry of a plug of an electrical appliance;

FIG. 4 illustrates a view of the cover according to the invention closed over a cord of an electrical appliance; and FIG. 5 illustrates a partially broken view of the cover with a cord sealed in place.

Referring to FIG. 1, the weatherproof electrical outlet box cover 10 comprises a housing 11 having sidewalls 12 which define a rectangular opening on one side and a pair of lids 13 which are mounted to close over the opening.

Referring to FIGS. 1 and 4, the housing 11 has a backwall 14 which is provided with a suitable opening 15 to receive an electrical outlet 16. The backwall 14 is sized to be mounted against a junction box 17 in which a pair of electrical outlets 16 are disposed. As shown in FIG. 4, a gasket 18 is provided between the cover 10 and the junction box 17 and the cover 10 is secured to the junction box 17 by suitable screws (not shown) which pass through the backwall 14 and gasket 18 into body of the receptacle which is fastened to the junction box 17.

As shown in FIG. 5, each of the lids 13 has a curvilinear portion which extends over the opening of the housing 11 as well as a pair of lug portions 19 which project into the housing 11 along the sidewalls 12'. Each of these lug portions 19 is pivotally mounted on a pin, rivet or integral stud 20 which projects from the sidewall 12'. The position of each stud 20 is such as to permit pivoting of the respective lid 13 in a circular arc between a closed position as shown in FIG. 2 to an open position as shown in FIG. 3. Alternatively, the lids 13 need not pivot on a circular arc but may be cammed together in a closed position.

In addition, each lid 13 has a recess 21 at an edge which faces a recess 21 in the other lid 13. Each of these recesses 21 extend longitudinally along the length of the lid 13 to receive a resilient sealing strip or gasket 22. Each strip 22 is fixedly mounted in the recess 21 for abutting against the other sealing strip 22. As shown in FIG. 1, the sealing strips 22 sealingly engage each other along their entire extent.

Referring to FIG. 2, a means is provided for biasing the lids 13 into a closed position. To this end, the means constitutes a spring 23 which is secured at the opposite ends to each lid 13. As shown, each end of the spring 23 is disposed about a pin 24 projecting from the inside of a lug portion 19. This spring 23 is of sufficient strength to bias the lids 13 into a closed position and to deform the sealing strips 22 against each other when the lids 13 are in the closed position. Each lid 13 is also provided with a gear-like arrangement or ratchet 25 at each end of the lug portions 19 as shown, or at only one end. As shown in FIG. 2, each gear-like arrangement 25 is located on the periphery of a lug portion 19 and is in meshing engagement with the other to synchronize the movement of the two lids 13 to each other.

Referring to FIG. 2, when the lids 13 are in the fully closed position, the sealing strips 22 are resiliently deformed against each other to form a seal-tight arrangement. In addition, longitudinal seals 26 are located between each lid 13 and a sidewall 12 about the opening of the housing 11 in order to further ensure the seal-tightness of the housing 11. These seals 26 are secured on the sidewalls 12 and are biased to slide relative to the lids 13 when the lids 13 are opened or closed.

Referring to FIG. 1, one of the lids 13 is provided with a gripping portion 27 which extends from a central region to provide a means of manually opening the lids 13.

Referring to FIG. 3, in order to insert a plug 28 of an electrical appliance (not shown) into an outlet 16, the lids 13 are opened by lifting up the gripping portion 27. This provides access to the housing 11 as illustrated. The plug 28 can then be plugged into the outlet 16. Thereafter, the lids 13 are released so as to be biased back into the closed position via the spring 23. The lids 13 then close on the cord 29 attached to the plug 28 while the resilient sealing strips 22 deform about the plug in seal-tight relation. At the same time, the lids 13 are brought into a fully closed position similar to the position shown in FIG. 2 while the sealing strips 22 abut against each other under a slight pressure to effect a seal. Thus, in the region of the cord 29, the sealing strips 22 are deformed to a greater extent than in the remainder of the sealing strips.

Referring to FIG. 5, although two electrical outlets 16 have been illustrated, the cover 10 may be used with a junction box which has one or more electrical outlets. Further, the gear-like arrangement 25 may be used at both ends of the lids 13 to synchronize movement of the lids 13 together.

The invention thus provides a weatherproof electrical outlet box cover which effects a complete seal about a cord of an electrical appliance plugged into an electrical outlet of the junction box. Thus, a spray of water, and the like cannot enter into the junction box through the cover from any direction. As shown in FIG. 5, when the cover 10 is in the closed condition with or without a cord in place, the lids 13 abut along the side edges against each other to effect a seal-tight relationship.

What is claimed is:

1. A weatherproof electrical outlet box cover comprising
   a housing having side walls, defining an opening and a back wall for receiving at least one electrical outlet, said back wall being disposed in alignment with said opening;
   a pair of lids pivotally mounted on said housing to close over said opening, each said lid having a recess at an edge thereof facing a recess in said other cover;
   means for moving said lids between a closed position over said opening to an opened position to provide access to the interior of said housing and an electrical outlet therein; and
   a pair of resilient sealing strips, each said sealing strip being disposed in a respective recess for abutting against the other of said sealing strips and for sealingly engaging about a cord of an electrical appliance plugged into the electrical outlet.

2. A cover as set forth in claim 1 wherein said means includes a spring, secured at opposite ends to a respective one of said lids to bias said covers together into said closed position.

3. A cover as set forth in claim 2 wherein each of said lids has a gear-like portion thereon meshing with the gear-like portion of the other of said lids to synchronize the movement of said lids to each other.

4. A cover as set forth in claim 3 wherein one of said lids has a gripping portion extending from a central region thereof.

5. A cover as set forth in claim 3 which further includes a pair of seals, each seal being disposed in sealing relation between one of said lids and a side wall of said housing.

6. A cover as set forth in claim 1 wherein said lids are made of transparent plastic.

7. A weatherproof electrical outlet box cover comprising
   a housing for covering over an electrical outlet, said housing having an opening on one side;
   a pair of lids mounted on said housing to close over said opening;
   means for moving said covers between closed position over said opening to an opened position to provide access to the interior of said housing and an electrical outlet therein;
   a pair of resilient sealing strips, each said strip being disposed at an edge of a respective lid in facing relation to the other of said strips for sealingly engaging about a cord of an electrical appliance extending into said housing to the electrical outlet; and
   means for biasing said lids into a closed position on each other.

8. A cover as set forth in claim 7 wherein each of said lids has a gear-like portion thereon meshing with the gear-like portion of the other of said lids to synchronize the movement of said lids to each other.

9. A cover as set forth in claim 8 wherein said biasing means includes a pair of springs, each spring being secured at opposite ends to a respective one of said lids to bias said lids together.

10. A cover as set forth in claim 9 wherein each said lid is pivotally mounted about an axis located between said springs and said gear-like portions when said lid is in said closed position.

* * * * *